United States Patent [19]
Peng

[11] Patent Number: 5,305,125
[45] Date of Patent: Apr. 19, 1994

[54] METHOD OF RECORDING HOLOGRAMS FOR USE IN OPTICAL SCANNERS

[75] Inventor: Ke-Ou Peng, Delft, Netherlands

[73] Assignee: Opticon Sensor Europe B.V., Hoofddorp, Netherlands

[21] Appl. No.: 4,116

[22] Filed: Jan. 13, 1993

[30] Foreign Application Priority Data

Jan. 28, 1992 [EP] European Pat. Off. ........ 92200240.7

[51] Int. Cl.$^5$ .................. G02B 5/32; G02B 26/10; G03H 1/04
[52] U.S. Cl. ........................ 359/17; 359/30; 359/212
[58] Field of Search ............ 359/17, 18, 30, 31, 359/212, 220, 221

[56] References Cited

U.S. PATENT DOCUMENTS

| | | | |
|---|---|---|---|
| 4,094,576 | 6/1978 | Heiling | 350/3.71 |
| 4,133,600 | 1/1979 | Russell et al. | 359/30 |
| 4,165,464 | 8/1979 | Ikeda et al. | 250/550 |
| 4,206,965 | 6/1980 | McGrew | 359/31 |
| 4,364,627 | 12/1982 | Haines | 359/30 |
| 4,415,224 | 11/1983 | Dickson | 350/3.71 |
| 4,540,247 | 9/1985 | Nishi et al. | 359/18 |
| 5,182,659 | 1/1993 | Clay et al. | 359/18 |
| 5,216,528 | 6/1993 | Honda et al. | 359/30 |

FOREIGN PATENT DOCUMENTS

| | | | |
|---|---|---|---|
| 0270778 | 6/1988 | European Pat. Off. | G06K 7/10 |
| 0435662 | 7/1991 | European Pat. Off. | G02B 26/10 |

*Primary Examiner*—Martin Lerner
*Attorney, Agent, or Firm*—Parmelee, Bollinger & Bramblett

[57] ABSTRACT

A method of recording holograms for use in optical scanners comprises the steps of generating a reference beam by means of a reference source, generating an object beam by means of an object source, and illuminating a photosensitive surface with both said object beam and said reference beam, wherein said object beam is divergent in a first direction and non-divergent in a second direction.

7 Claims, 5 Drawing Sheets fig-1
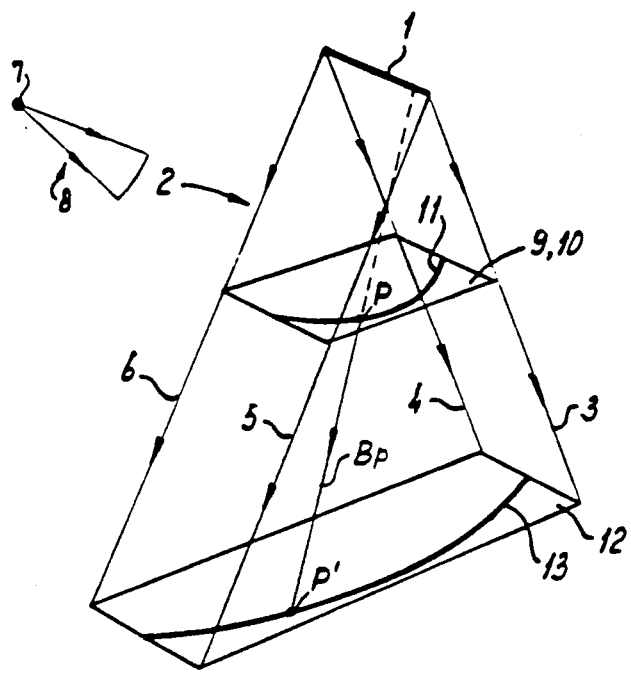
fig-1a
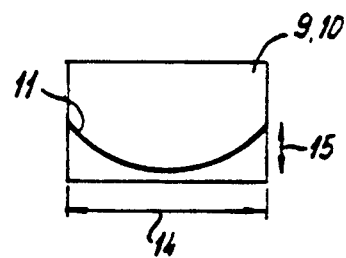
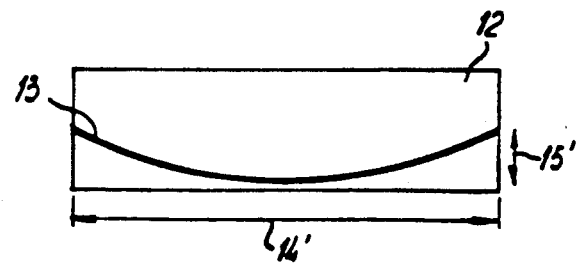

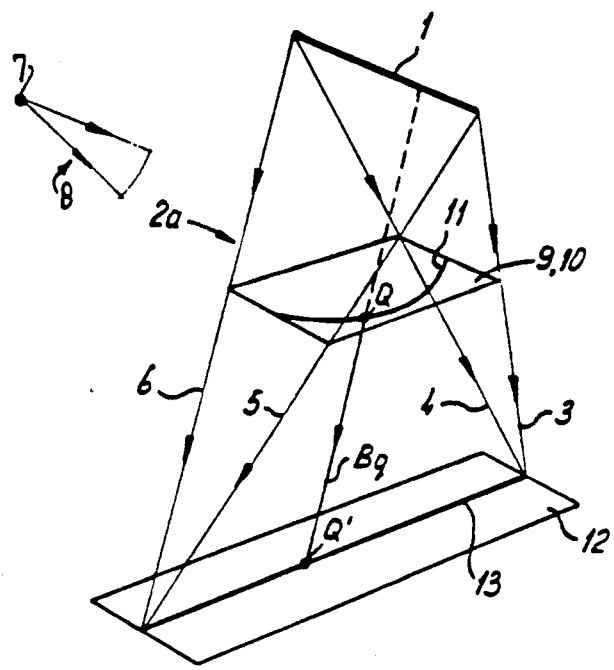
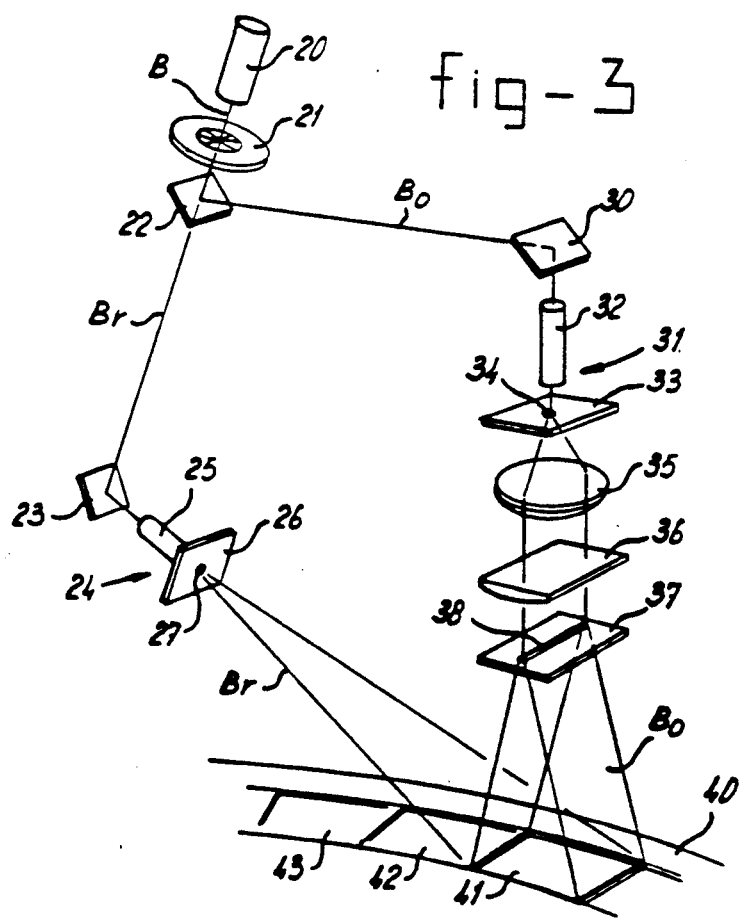

METHOD OF RECORDING HOLOGRAMS FOR USE IN OPTICAL SCANNERS

BACKGROUND OF THE INVENTION

The invention relates to a method of recording holograms for use in optical scanners, comprising the steps of generating a reference beam by means of a reference source, generating an object beam by means of an object source, and illuminating a photosensitive surface with both the object beam and the reference beam. The invention further relates to an apparatus for implementing such a method, as well as to an optical scanner, more particularly a bar code scanner, comprising one or more holograms recorded according to such a method.

Holograms are widely used in active optical scanners as laser beam deflectors. The laser beam of the scanner is made to impinge upon a hologram and is subsequently deflected by the hologram towards a scanning plane, in which the symbol to be scanned will be located. As the laser beam is made to move relative to the hologram, the point of incidence of the laser beam travels across the surface of the hologram, producing a locus or path of the incident laser beam across this surface. This path of the point of incidence across the surface of the hologram causes the deflected beam to describe a certain path or scanning pattern across the scanning plane. As the beam deflection may depend on the particular point of incidence on the hologram, the scanning line or pattern generated by the laser beam on the scanning plane is influenced by the shape of the path of the beam across the hologram surface. That is, the locus of the laser beam determines, in conjunction with the deflection properties of the hologram, the scanning pattern across the scanning plane.

Many scanners in which holograms are used comprise a holographic disc, i.e. a disc containing several holographic facets and/or on which one or more holograms are mounted. Such a disc can e.g. be stationary, while the laser beam is rotating relative to the disc. The moving laser beam traverses each hologram of the disc in turn. As each hologram or holographic facet may produce a different scanning pattern, such as a single scanning line, each turn of the disc results in a number of scanning lines being produced. In order to obtain a multiple-directional scanning pattern, the holographic facets are in most scanners arranged in a circle, the laser beam sweeping the disc along a circular locus. This implies that the path of the beam across each hologram is curved, this path being an arc of a circle.

Conventionally, holograms are recorded using two sources, producing two beams: a reference beam and an object beam. A laser beam having the same wavelength as the reference beam and issuing from the same point will be deflected by the hologram in such a way, that the object beam is reconstructed. As the laser beam impinging upon a hologram during operation of an optical scanner, i.e. the reconstruction beam, generally issues from a single point, the reference beam employed for recording holograms for use in a scanner is preferably spherical. The object beam, however, is conventionally spherical or collimated. A collimated object beam will result in parallel deflected beams, each deflected beam originating from a point of incidence of the laser beam upon the hologram. Consequently, the arc-shaped path of the laser beam on the surface of the hologram normally results in a curved scanning line on the scanning plane and thus across the symbol to be scanned.

However, for many applications, e.g. for reading bar codes, it is desired to have substantially straight scanning lines. Curvature of the scanning pattern may result in the scanner being virtually unable to decode the scanned symbol. In the case of bar codes, a curved scanning line may not intersect all bars and consequently the code cannot be read.

SUMMARY OF THE INVENTION

It is therefore an object of the invention to provide a method of recording holograms for use in optical scanners, the method producing holograms which greatly reduce or substantially eliminate the curvature of scanning lines. The method according to the invention is characterized in that the object beam is divergent in a first direction and non-divergent in a second direction.

When a hologram recorded according to the method of the invention is used in an optical scanner, the divergence of the object beam in the first direction during recording will result in the divergence in this first direction of the deflected beams issuing from successive points of the hologram. Because of this divergence, the arc or curved path of the laser beam across the hologram will be magnified in this first direction. As the object beam, and hence the successive deflected beams during operation of the scanner, does not diverge in the second direction, the arc is not magnified in the second direction or, when the first and second directions are not perpendicular, magnified to a lesser extent. With a hologram recorded according to the inventive method it is therefore possible to reduce the curvature of the scanning arc by magnifying the length (i.e. the chord) of the arc while keeping the width (i.e. the sagitta) of the arc substantially constant or at least magnifying the width to a lesser extent.

Preferably, the first direction is perpendicular to the second direction. In this case, the arc will not be magnified at all in the second direction, resulting in a maximal elongation of the arc and thus in a maximal reduction of its curvature.

In order to produce the desired scanning pattern, the method according to the invention may be carried out in such a way, that the object beam is tilted with respect to the photosensitive surface.

According to the invention, the curvature of the scanning line can be further reduced if the object beam converges in the second direction. The elongation of the chord of the arc caused by the object beam being divergent in the first direction is enhanced by the reduction of the sagitta of the arc in the second direction. The curvature can be substantially eliminated when the method according to the invention is carried out in such a way that the object beam converges in the second direction on a straight line. That is, the scanning line is the image of the straight line of convergence of the object beam. In this case, the sagitta of the arc is reduced to zero if the reconstruction beam has the same wave-length as the recording beam. In fact, as the hologram reproduces the object image, the image produced by the laser beam incident upon the hologram is the desired scanning pattern, i.e. a straight scanning line. This straight line, which constitutes the focal line of the object beam as well as the scanning line of the reconstruction beam, i.e. of the laser beam in the optical scanner, is preferably chosen so as to lie in the scanning plane of the optical scanner.

The method according to the invention can also be employed using a recording beam, i.c. an object beam, which converges in the second direction while not diverging in the first direction. That is, a recording beam can be used which is collimated in the first direction and converging in the second direction. Even an object beam could be used having a greater focal length in the first direction than in the second direction.

Although various sources can be used for producing the inventive object beam, preferably the object beam is generated using a line source. With a line source, a substantially fan-shaped object beam can conveniently be produced. Of course such a line source can be realized by means of suitable beam-shaping means.

An apparatus for implementing the method according to the invention preferably comprises a source for producing a reference beam and an object beam, focussing means for focussing the reference beam and the object beam, and beam-shaping means for producing an object beam being divergent in a first direction and non-divergent in a second direction. The first and second laser source are preferably constituted by a single laser and a half mirror.

Holograms recorded by means of the method according to the invention are perfectly suitable for application in bar code scanners. Preferably, a bar code scanner comprising a disc provided with holograms produced according to the invention further comprises a laser source for producing a laser beam, deflection means for deflecting the laser beam towards the disc, as well as drive means for rotating the deflection means relative to the disc, thus producing a path or locus of the laser beam on the holograms, wherein the first direction is substantially coincident or parallel with the general direction of the locus. The drive means are preferably arranged for steering the deflection means in such a way that the laser beam can sweep across the holograms of the holographic disc. In such an arrangement, the holographic disc can be stationary, the movement of the laser beam relative to the disc being provided by the rotation of the deflection means, instead of by the rotation of the disc relative to the laser source as in most conventional holographic scanners. As the deflection means, e.g. a single mirror, generally has much smaller dimensions than the holographic disc, the mass to be rotated in the scanner according to the invention is greatly reduced. This provides a significant reduction of the time required for the scanner to become operational, i.e. the time the drive means need to accelerate the rotating element (i.c. the deflection means) to its speed of operation. Furthermore, the smaller rotating body produces less vibrations in the scanner, resulting in a more stable focussing and positioning of the scanning lines in the scanning plane.

As the focal length of the holographic facet in the first direction may be different from the focal length in the second direction, the bar code scanner according to the invention is preferably provided with deflection means having optical power. That is, the deflection means may e.g. have a focussing power in one direction in order to compensate for the difference in focal length in the two directions of the hologram.

In order to be able to successfully scan and read codes at varying distances from the scanner, the inventive bar code scanner preferably is provided with a disc comprising a plurality of holograms having different focal lengths. The different focal lengths of the holograms (or holographic facets) on the disc result in scanning lines being produced in different focal planes, i.e. focussed scanning lines are produced in a number of scanning planes at different distances from the scanner. These scanning planes, which are normally parallel to each other, preferably intersect the rotational axis of the scanner and may be substantially perpendicular to this axis.

The scanning pattern produced in a scanning plane, i.e. the plane in which the symbol to be scanned is located, usually consists of a number of scanning lines arranged in a particular fashion. Preferably, the bar code scanner according to the invention is arranged for producing at least one star-shaped scanning pattern. That is, the scanner may produce a single pattern consisting of a number of scanning lines converging on a common area, or a pattern made up of two or more of such single patterns, or possibly a single star-shaped pattern complimented by a number of e.g. peripherically located scanning lines.

Although the curvature of the scanning line is substantially reduced by using holograms recorded with an object beam converging in the second direction on a straight line, a complete elimination of the curvature can be achieved with the bar code scanner according to the invention if the reconstruction beam has substantially the same wavelength as the reference beam and the object beam used for producing the holograms, the reconstruction beam having an orientation relative to the hologram which corresponds to that of the reference beam. That is, during reconstruction (scanning) the recording conditions are recreated, which enables the holograms to exactly reproduce the recorded straight line.

The invention enables a bar code scanner to be realized which produces a multiple-directional, virtually curvature-free scanning pattern. The holographic elements (facets) of the disc can be made in such a way that they deflect the incident laser beam towards the axis of rotation of the scanner (i.e. the axis of rotation of the deflection means relative to the disc). The deflected laser beam may intersect the axis of rotation at various distances from the scanner. Thus, a bar code scanner having a very advantageous scanning capability can be realized.

BRIEF DESCRIPTION OF THE DRAWINGS

The invention will further be explained by reference to the drawings, in which:

FIGS. 1 and 1a illustrate schematically and in perspective the principle of the method according to the invention.

FIG. 2 illustrates schematically and in perspective the principle of another version of the method according to the invention.

FIG. 3 shows an apparatus for implementing the method according to the invention.

DETAILED DESCRIPTION OF THE DRAWINGS

Figure 4:
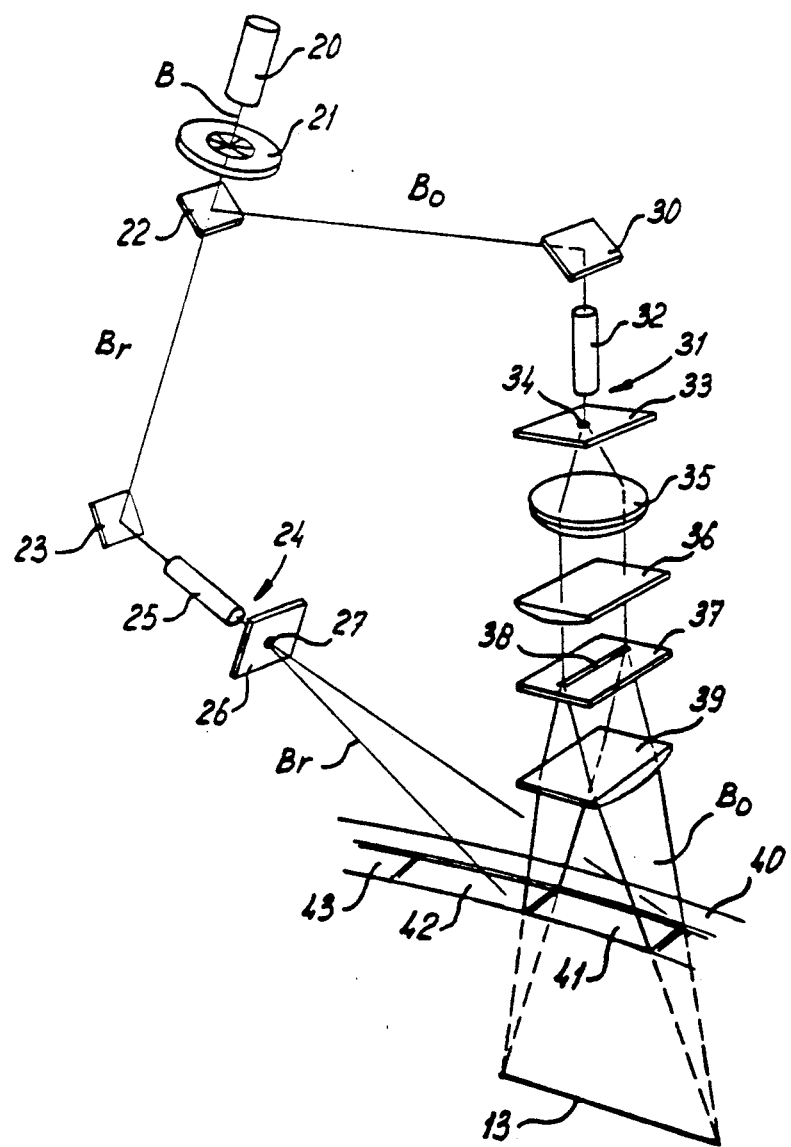
FIG. 4 shows an apparatus for implementing the other version of the method according to the invention.

In FIG. 1, a schematically indicated object source 1 produces a fan beam 2, the boundaries of which are indicated by the rays 3, 4, 5 and 6. As can be seen from FIG. 1, ray 3 is parallel with ray 4, while ray 5 is parallel with ray 6. The rays 3 and 5, as well as 4 and 6, are mutually divergent. A schematically indicated reference source 7 produces a reference beam 8 which may, for example, be spherical. In order to record a hologram, a photosensitive surface 9 is placed in the beam 2. Consequently, light from the beams 2 and 8 impinges upon the surface 9 and produces a hologram 10.

In an optical scanner the hologram 10 recorded with the fan-shaped beam 2 will be used to deflect the light of a reconstruction beam, such as a laser beam. Preferably, the reconstruction laser beam has the same wavelength as the reference beam, the point from which the reconstruction beam issues being located at the same position as the point from which the reference beam issued during recording. A reconstruction laser beam (not shown) incident upon the hologram 10 in point P will therefore be deflected to point P′ on scanning surface 12, which is the surface in which the symbol to be scanned is located. The deflected reconstruction beam is referred to as Bp. As the reconstruction beam will be moved relative to the hologram, the points of incidence of the laser beam upon the hologram 10, i.e. the locus of the point P, constitutes a path 11. Due to the structure of most scanners, in which the laser beam describes a circular motion relative to the holograms as will be explained with reference to FIG. 5, the path 11 will in most instances be curved. As a result of this, path or scanning line 13, i.e. the locus of the deflected reconstruction beam on scanning plane 12, will also be curved. However, due to the divergence of the recording fan beam 2, the deflection of the hologram 10 is such that the curvature of the path 13 on the scanning plane 12 is considerably reduced compared with that of the path 11 on the hologram 10. This is illustrated in FIG. 1a, in which both the hologram 10 and the scanning plane 12 are shown schematically in top view. The arc-shaped path 11 has a chord 14 and a sagitta 15. As the fan beam 2 diverges in the direction of the chord 14 (the first direction) but does not diverge, i.e. is parallel, in the direction of the sagitta 15 (the second direction), chord 14′ of the path 13 is considerably longer than the chord 14 of the path 11, while sagitta 15′ of the path 13 has the same length as the sagitta 15 of the path 11. Hence, the curvature of the path 13 is smaller than that of the path 11.

It will be understood that FIGS. 1 and 1a merely schematically illustrate the principle of the invention. In most applications, the distance between the hologram 10 and the scanning surface 12 may be greater than illustrated in FIG. 1, resulting in a greater elongation of the chord 14′ of the arc-shaped path 13. Furthermore, as the path 11 will in most practical situations be less curved than illustrated in FIG. 1a, an approximately straight scanning line 13 may result.

In the FIGS. 1 and 1a, the object source 1 illustrated is a line source. Other sources producing a beam divergent in a first direction (i.e. a direction approximately coincident with the direction of the chord 14 of the curved path 11) and non-divergent in a second direction (i.e. a direction approximately coincident with the direction of the sagitta 15 of the path 11) can be used. It will be understood that the direction of divergence of the beam does not necessarily have to be parallel or coincident with the chord 14 of the path 11, nor do the first and second directions have to be perpendicular. It is, however, essential that the chord 14 of the arc-shaped curved path 11 is increased relative to the sagitta 15 in order to reduce the curvature of the path 13 relative to the path 11. This may even be accomplished while decreasing the lengths of both the chord 14 and the sagitta 15, although an increase will generally be preferred.

In the geometry of FIG. 2, a line source 1 produces a fan beam 2a. Contrary to the fan beam shown in FIG. 1, the fan beam 2a of FIG. 2 is focussed on the scanning line 13. That is, the fan beam 2a is divergent in the direction of the chord of the arc-shaped path 11, and is convergent in the direction of the sagitta of the path 11. When used in a scanner, a reconstruction beam incident upon point Q of the path 11 will reconstruct the beam Bq originating in the object source 1 and will therefore be deflected towards the point Q′ on the path or scanning line 13. In fact, the hologram 10 will deflect a beam impinging upon any point of its surface towards the straight scanning line 13. Because of this, the curved path 11 of the laser beam on the hologram 10 will result in a straight path or scanning line 13 on the scanning surface 12.

The apparatus for implementing the method according to the invention, as shown in FIG. 3, comprises a laser source 20 for producing a laser beam B and a shutter 21 for controlling the exposure time of the hologram which is to be recorded. A half mirror 22 functions as beam splitter for splitting the beam B into an object beam Bo and a reference beam Br. The latter is directed by a mirror 23 towards a beam expander 24 consisting of an objective 25 and a plate 26 with a pinhole 27. The resulting spherical reference beam Br is projected onto a photosensitive facet 41 of a disc 40.

The object beam Bo is directed by a mirror 30 towards a beam expander 31 consisting of an objective 32 and a plate 33 with a pinhole 34. The resulting spherical beam is collimated by a lens 35 and subsequently projected on a cylindrical lens 36. A plate 37 having a slit 38, which is coincident with the focal line of the lens 36, provides a line source. The fan-shaped object beam Bo emanating from the slit 38 is projected onto the facet 41. In combination, the object beam Bo and the reference beam Br produce a hologram on the photosensitive facet 41. After sufficient exposure of the facet 41 has been obtained, the shutter 21 may be closed and the disc 40 may be rotated in order to record the next facet 42.

It will be understood that FIG. 3 depicts the recording apparatus merely schematically. That is, the actual distances between the components shown, such as the distance between the lens 36 and the plate 37, may be adjusted to suit practical needs and circumstances. The optical axis extending from the objective 32 to the slit 38 may be tilted according to the requirements of the desired pattern.

The recording apparatus shown in FIG. 4 also comprises a laser source 20, a shutter 21, a mirror 22, a further mirror 23, a beam expander 24, a still further mirror 30, a further beam expander 31, a lens 35, a cylindrical lens 36 and a plate 37 provided with a slit 38. In this embodiment, however, a second cylindrical lens 39 is provided in order to focus the object beam Bo on a straight focussing line 13. As is shown in FIG. 4, the (imaginary) focussing line 13 is located beyond the facet 41. Holographic facets 41, 42 etc. recorded by means of the apparatus of FIG. 4 produce straight scanning lines, as explained in reference to FIG. 2.

The apparatus of FIG. 4 can be simplified by omitting the lens 35, the cylindrical lens 36 and the plate 37. That is, a recording set-up for producing a straight focal line of the object beam can be obtained in which the expanded beam emanating from the beam expander 31 is passed through a cylindrical lens 39 only before impinging upon the facet 41.

Reflective holograms can be recorded according to the method of the invention if the optics (23, 24) for producing the reference beam Br are moved to the other side of the disc 40, i.e. if the optics for producing the reference beam and the object beam are located at opposite sides of the disc 40. The arrangements of both FIG. 3 and FIG. 4 can be adapted in this manner.

Figure 5:
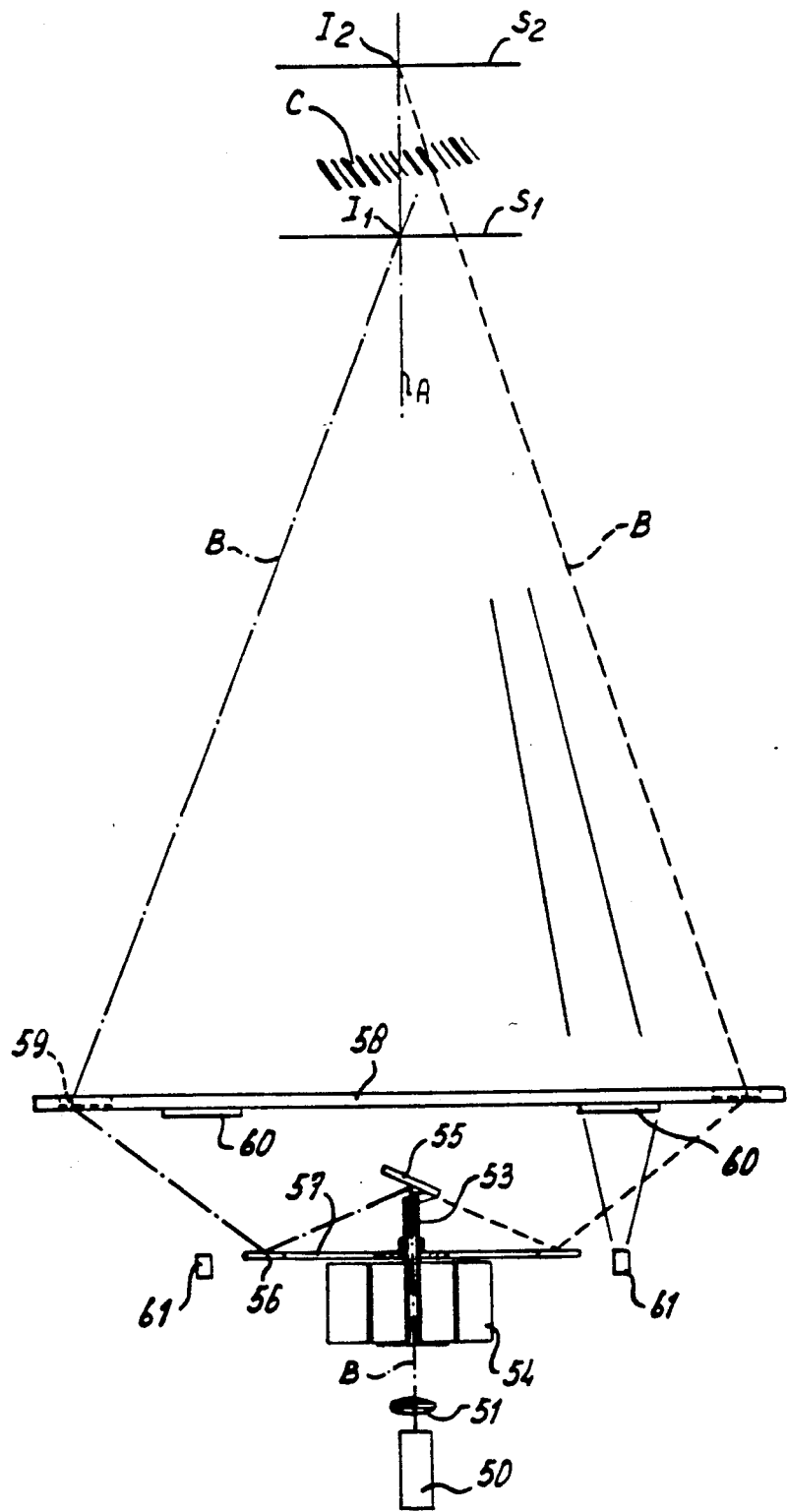
FIG. 5 shows a bar code reader comprising one or more holograms recorded according to the invention.

FIG. 5 shows a bar code scanner in which holograms according to the invention can be employed. The scanner comprises a laser source 50 for producing a laser beam (reconstruction beam) B. The laser beam B is focussed by focussing optics, such as a lens, 51 and is passed through the hollow shaft 53 of drive means, such as an electric motor 54. This passing of the laser beam B through the hollow shaft 53 allows the beam B to be coincident with the axis of rotation of the scanner.

On the shaft 53, a mirror 55 (or other deflecting means) is mounted for deflecting the laser beam towards a ring of mirrors 56. When the laser beam B used for scanning has the same wavelength as the recording beam, the point of incidence of the laser beam B on the rotating mirror 55, as imaged by the mirror ring 56, corresponds with the position of the reference source during recording. When the wavelengths are different, the position of the point of incidence has to be shifted to minimize the curvature of the scanning lines arising from this difference in wavelength. This ring of mirrors 56 may consist of a number of separate mirrors mounted on a plate 57, or actual ring-shaped mirrors connected with the plate 57. The ring of mirrors 56, which is preferably held stationary by suitable support means (not shown), deflects the laser beam B sweeping over its surface towards holograms or holographic facets 59. These holograms 59, which are substantially identical to the hologram 10 of FIGS. 1 and 2 and the facets 41, 42, etc. of FIGS. 3 and 4, are mounted on or are part of a further plate or disc 58. The disc 58, which may be identical to the disc 40 shown in FIGS. 3 and 4 but which does not have to be circular, is preferably held stationary by suitable support means (not shown). That is, the drive means 54 only rotate the shaft 53 and the mirror 55. The rotating mass of the scanner is therefore very small.

The holograms or holographic facets 59 deflect the laser beam B in the direction of a symbol to be scanned, e.g. a bar code C. As the deflecting angles preferably vary between the facets 59, the laser beam B may intersect the rotational axis A at more than one point, e.g. at the points $I_1$ and $I_2$, resulting in e.g. two scanning planes $S_1$ and $S_2$ in which a code located near the axis of the scanner can effectively be scanned. That is, a bar code C located approximately at or near such a point of intersection or scanning plane can be correctly scanned. It will be understood that more than two points of intersection or scanning planes can be realized, and that the maximum number of points of intersection depends on the number of facets 59. Of course several facets 59 may project their deflected beams towards the same point of intersection, i.e. towards the same scanning plane located at that point of intersection.

Light which is backscattered from the bar code C is focussed by lenses 60 and detected by detectors 61. The lenses 60 are conveniently arranged in the plate 58, which may be transparent or be provided with suitable openings (not shown) for passing the light.

Instead of a disc 58 having deflective (transmittive) holographic facets 59, a disc having reflective holographic facets may be used, in which case the optics for producing the scanning beam shown in FIG. 5 should be moved to the other side of the disc, such that the scanning beam incident upon the disc and the diffracted (reflected) beam appear at the same side. The ring 56 may be omitted if the dimensions of the scanner are not critical. The shaft 53 of the motor 54 may be solid if the laser beam is incident upon the mirror 55 from the opposite direction.

Figure 6:
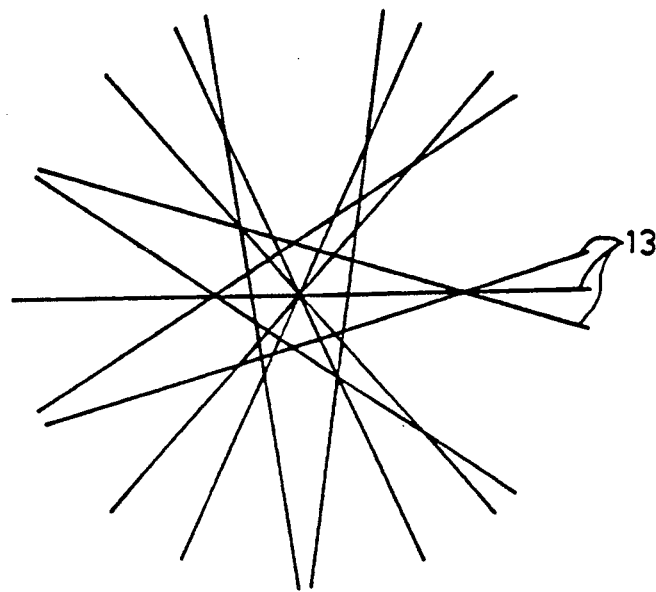
FIGS. 6a and 6b show by way of example scanning patterns produced by a bar code reader according to the invention.
Figure 6:
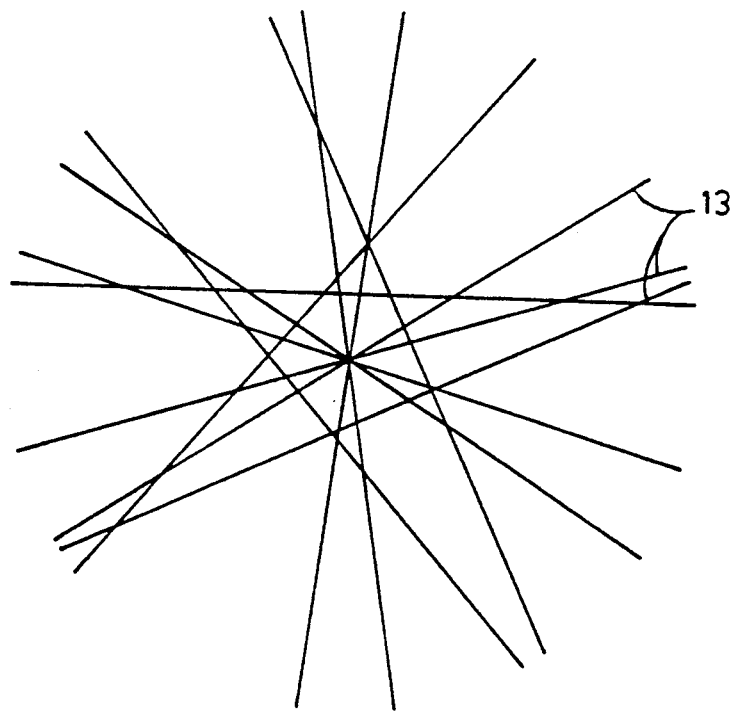

FIG. 6 shows a typical scanning pattern produced by means of a holographic disc having 11 facets. Five facets produce a star-like pattern in the first scanning plane $S_1$, as illustrated in FIG. 6a, while the remaining facets produce a pattern in the second scanning plane $S_2$, as illustrated in FIG. 6b, each pattern consisting of a number of scanning lines 13. In this way, an effective scanning in two planes is possible.

The inventive scanner allows symbols, e.g. bar codes, to be read at a wide range of distances by providing a multitude of scanning planes. In each scanning plane, a number of holographic facets 59 produce scanning lines. The method for recording holograms according to the invention allows these scanning lines to be approximately straight or completely straight, thereby making an excellent scanning capability possible.

I claim:

1. A scanning device comprising:
   a first mirror means drivingly connected to a motor by a hollow shaft;
   a light source to generate a light beam and to direct said light source to the first mirror means through said hollow shaft;
   stationary holographic means comprising at least one stationary holographic facet,
   wherein, during operation, the first mirror means is rotated by the motor and said light beam is reflected by said rotating mirror means to sweep across each stationary holographic facet to generate a scanning pattern of at least one line, and
   wherein each holographic facet is produced by means of at least the following process steps:
   a. generating a reference beam by means of a reference source,
   b. generating an object beam, which is focused to a line focus by appropriate focusing means, which line focus is then diverged in a first direction and is non-diverged in an orthogonal second direction, and
   c. illuminating a photosensitive surface with both said reference beam and said object beam.

2. A scanning device according to claim 1 wherein the line focus of the object beam is diverged in the first direction and is collimated in the orthogonal second direction.

3. A scanning device according to claim 1 wherein the line focus of the object beam is diverged in the first direction and is converged in the orthogonal second direction.

4. A scanning device according to claim 1 wherein each holographic facet is reflective.

5. A scanning device according to claim 1 wherein each holographic facet is transmittive and the device comprises a ring shaped second mirror means to reflect the light beam reflected from the first mirror means to each transmittive holographic facet.

6. A scanning device according to claim 1 wherein each holographic facet has its own predetermined focal length.

7. A scanning device according to claim 1 comprising several holographic facets to produce at least one star-shaped scanning pattern.

* * * * *